(12) United States Patent
Hansen et al.

(10) Patent No.: US 10,948,105 B2
(45) Date of Patent: Mar. 16, 2021

(54) VALVE ARRANGEMENT AND DIAPHRAGM ASSEMBLY FOR A VALVE ARRANGEMENT

(71) Applicant: Danfoss A/S, Nordborg (DK)

(72) Inventors: Jesper Schmidt Hansen, Sonderborg (DK); Leo Finn Jensen, Middelfart (DK); Anders Pedersen, Middelfart (DK)

(73) Assignee: DANFOSS A/S, Nordborg (DK)

( * ) Notice: Subject to any disclaimer, the term of this patent is extended or adjusted under 35 U.S.C. 154(b) by 15 days.

(21) Appl. No.: 16/076,877

(22) PCT Filed: Feb. 7, 2017

(86) PCT No.: PCT/EP2017/052641
§ 371 (c)(1),
(2) Date: Aug. 9, 2018

(87) PCT Pub. No.: WO2017/137395
PCT Pub. Date: Aug. 17, 2017

(65) Prior Publication Data
US 2019/0040976 A1 Feb. 7, 2019

(30) Foreign Application Priority Data

Feb. 11, 2016 (DK) .............................. PA201600084

(51) Int. Cl.
*F16K 47/14* (2006.01)
*F16K 31/40* (2006.01)

(52) U.S. Cl.
CPC ............ *F16K 47/14* (2013.01); *F16K 31/404* (2013.01)

(58) Field of Classification Search
CPC ..... F16K 47/14; F16K 31/404; F16K 31/0693
(Continued)

(56) References Cited

U.S. PATENT DOCUMENTS 2,654,559 A * 10/1953 Franck ...................... F16K 7/16
251/331
2,710,629 A * 6/1955 Price ...................... F16K 7/126
251/331

(Continued)

FOREIGN PATENT DOCUMENTS

CN 202165481 U 3/2012
CN 202188203 U 4/2012
(Continued)

OTHER PUBLICATIONS

International Search Report for PCT Serial No. PCT/EP2017/052641 dated Apr. 6, 2017.
(Continued)

*Primary Examiner* — John Bastianelli
(74) *Attorney, Agent, or Firm* — McCormick, Paulding & Huber PLLC

(57) ABSTRACT

A valve arrangement comprising a valve housing, a valve inlet, a valve outlet and a diaphragm assembly for controlling a fluid flow through the valve housing from the valve inlet to the valve outlet, the diaphragm assembly comprising a diaphragm and a diaphragm plate at least partially covering the diaphragm, the diaphragm comprising one or more equalization holes passing through the diaphragm and the diaphragm plate comprising one or more equalization openings passing through the diaphragm plate, the equalization holes being aligned with the equalization openings. The diaphragm assembly comprises an engagement zone engaging the diaphragm in order to rotationally fix the diaphragm and the diaphragm plate with respect to each other so that the equalization holes will keep aligned with the equalization openings to ensure proper function of the valve arrangement at all times.

15 Claims, 7 Drawing Sheets

(58) Field of Classification Search
USPC .................. 251/30.01–30.05, 331, 335.2
See application file for complete search history.

(56) References Cited

U.S. PATENT DOCUMENTS

| | | | | |
|---|---|---|---|---|
| 3,111,960 | A | * 11/1963 | Marmo | F16K 31/404 137/315.03 |
| 3,181,990 | A | * 5/1965 | Reiling | B29C 51/14 428/139 |
| 3,593,956 | A | * 7/1971 | McCarty, Jr. | F16K 31/404 251/30.03 |
| 3,630,482 | A | * 12/1971 | Beller | F16K 31/404 251/30.03 |
| 3,672,627 | A | * 6/1972 | McCarty, Jr. | F16K 31/404 251/30.03 |
| 3,784,154 | A | * 1/1974 | Ostrowski | F16K 31/404 251/30.01 |
| 3,872,878 | A | * 3/1975 | Kozel | F16K 31/404 137/242 |
| 4,178,573 | A | * 12/1979 | Swanson | H01F 7/1607 251/30.03 |
| 4,179,096 | A | * 12/1979 | Fromfield | F16K 31/404 251/30.03 |
| 4,421,295 | A | * 12/1983 | Parkison | F16K 41/103 251/331 |
| 4,558,843 | A | 12/1985 | Hoefelmayr | |
| 4,715,578 | A | * 12/1987 | Seltzer | F16K 7/17 251/25 |
| 4,836,236 | A | * 6/1989 | Ladisch | F16K 27/07 137/241 |
| 5,269,333 | A | * 12/1993 | Richmond | F16K 31/404 137/1 |
| 5,449,142 | A | * 9/1995 | Banick | F16K 31/404 251/30.04 |
| 5,456,279 | A | 10/1995 | Parsons et al. | |
| 6,076,550 | A | * 6/2000 | Hiraishi | F16K 31/0655 137/550 |
| 6,457,697 | B1 | * 10/2002 | Kolze | F16K 31/404 251/30.02 |
| 2012/0228535 | A1 | * 9/2012 | Da Pont | F16K 31/404 251/129.15 |

FOREIGN PATENT DOCUMENTS

| | | |
|---|---|---|
| CN | 102667283 A | 9/2012 |
| CN | 102691807 A | 9/2012 |
| CN | 102853107 A | 1/2013 |
| EP | 0312781 A1 | 4/1989 |
| FR | 2223618 A1 | 10/1974 |
| GB | 1141240 A | 1/1969 |
| GB | 2509796 A | 7/2014 |
| JP | S52103704 A | 8/1977 |
| JP | S632885 U | 1/1988 |
| WO | 2011/061777 A1 | 5/2011 |

OTHER PUBLICATIONS

European Examination Report for Serial No. 17703747.0 dated Feb. 5, 2020.
European Examination Report for Serial No. 17 703 747.0 dated May 14, 2019.

* cited by examiner

VALVE ARRANGEMENT AND DIAPHRAGM ASSEMBLY FOR A VALVE ARRANGEMENT

CROSS-REFERENCE TO RELATED APPLICATIONS

This application is a National Stage application of International Patent Application No. PCT/EP2017/052641, filed on Feb. 7, 2017, which claims priority to Danish Patent Application No. 201600084, filed on Feb. 11, 2016, each of which is hereby incorporated by reference in its entirety.

TECHNICAL FIELD

The present invention relates to a valve arrangement comprising a valve housing, a valve inlet, a valve outlet and a diaphragm assembly for controlling a fluid flow through the valve housing from the valve inlet to the valve outlet, the diaphragm assembly comprising a diaphragm and a diaphragm plate at least partially covering the diaphragm, the diaphragm comprising one or more equalization holes passing through the diaphragm and the diaphragm plate comprising one or more equalization openings passing through the diaphragm plate, the equalization holes being aligned with the equalization openings. Furthermore, the invention relates to a diaphragm assembly for the valve arrangement.

BACKGROUND

In such valve arrangements and diaphragm assemblies a pressure equalization takes place through the equalization holes present in the diaphragm. It is therefore of high importance to keep the equalization holes and the equalization openings aligned with each other so as to prevent malfunction of the valve. Therefore, the diaphragm and the diaphragm plate should be rotationally fixed with respect to each other.

However, depending for example on the material of the diaphragm, a hard flanging of the diaphragm assembly may be impossible without risking diaphragm damage. The situation can even be more complicated when the diaphragm has a slippery surface like a diaphragm made of polytetraflourethylene (PTFE), so that the diaphragm and the diaphragm plate may slip with respect to each other easily.

Fiber reinforced PTFE diaphragm may be used which allows hard flanging and thus good rotational fixation. This option is however not desired as the costs for using such fiber reinforced PTFE diaphragms can be in the order of ten times higher than that for standard PTFE diaphragms.

In many situations, it is furthermore not an option to reduce the radial extension of the diaphragm plate in order to prevent blocking of the equalization holes as the diaphragm plate serves as a guidance member for the diaphragm by cooperating with an inner sidewall of the valve housing. Thus, the radial extension of the diaphragm plate may be determined by the measures of the valve housing.

Lastly, in many situations it is not an option to place the equalization holes of the diaphragm radially more outwards on the diaphragm as then the valve housing wall may block the equalization holes. Therefore, having the equalization openings in the diaphragm plate can often not be avoided.

A known solution is to design the equalization openings of the diaphragm plate with a significantly larger diameter than the equalization holes of the diaphragm so as to permit a certain rotation and thus alignment offset between the diaphragm and the diaphragm plate without covering the equalization holes with the diaphragm plate immediately. However, this solution may be complicated in design and obviously has its limitations in view of maximal rotation allowed between diaphragm and diaphragm plate before the equalization holes become covered by the diaphragm plate.

SUMMARY

Therefore, the object of the present invention is to provide a valve arrangement and a diaphragm assembly having good rotational fixation between the diaphragm and the diaphragm plate at a low price.

This objective is solved by a valve arrangement as described in the outset in that the diaphragm assembly comprises an engagement zone engaging the diaphragm in order to rotationally fix the diaphragm and the diaphragm plate with respect to each other.

Having engagement between diaphragm and diaphragm plate in the engagement zone prevents rotation between diaphragm and diaphragm plate in a simple and effective manner. Thus, equalization holes of the diaphragm and equalization openings of the diaphragm plate will remain aligned with each other and unwanted slipping between diaphragm and diaphragm plate will not occur anymore.

According to the invention, the equalization hole is a throughhole forming a passage from a first side of the diaphragm to a second side of the diaphragm.

It is preferred that the engagement zone radially surrounds a center hole of the diaphragm plate. This allows equally well distributed engagement between diaphragm plate and diaphragm. The engagement zone may cover more than 10 percent of the surface of the diaphragm plate facing the diaphragm. Preferably, the engagement zone covers more than 25 percent, more preferably more than 50 percent and even more preferably more than 75 percent of the surface of the diaphragm plate facing the diaphragm. A high rate of coverage may result in very good rotational fixing. However, in the alternative, the engagement zone may be placed distant from the center hole. Preferably, the engagement zone is provided on the surface of the diaphragm plate facing the diaphragm. Furthermore, in some embodiments, the engagement zone may provide a single engagement element or a group of engagement elements, arranged on the surface of the diaphragm plate facing the diaphragm. In some embodiments of the invention, the engagement zone is provided by a washer ring. Preferably, the washer ring is seated on the diaphragm plate, the washer ring being interposed between the diaphragm plate and the diaphragm. It is preferred that the washer ring coaxially surrounds the center hole and provides the engagement zone for both the diaphragm plate and the diaphragm. This allows for easy production of the engagement zone.

In a preferred embodiment of the invention, the engagement zone comprises one or more protrusions engaging the diaphragm. In some embodiments of the invention, there is just one protrusion. This can result in minimal effort during production of the diaphragm plate while still having a good engagement. Other embodiments of the invention have two or more protrusions. This may result in especially good interlocking between the diaphragm plate and the diaphragm. In some embodiments of the invention, the protrusions are pins, sawtooth edges or cubic protrusions. The mentioned protrusion types can easily be formed on the surface of the diaphragm plate facing the diaphragm, preferably by casting or machining. The washer ring may comprise a plurality of teeth as protrusions engaging both the diaphragm plate and the diaphragm so as to prevent rotation.

It is preferred that the protrusions form a knurling engaging the diaphragm. The knurling can be established easily on the diaphragm plate, preferably by knurling, and will increase friction between the diaphragm plate and the diaphragm significantly. Preferably, the knurling stands out from the surface of the diaphragm plate facing the diaphragm so that the knurling is pressed into the diaphragm when the diaphragm assembly is assembled. Having the knurling pressed into the diaphragm will provide for reliable interlocking between diaphragm plate and diaphragm. The knurling may be formed directly on the diaphragm plate or may be provided as a separate part, for example as a part being glued or cast to the diaphragm plate or on the washer ring. The latter may allow to provide already existing diaphragm plates with additional knurling and thus may provide good rotational fixing even for already existing diaphragm plates when applied in future applications.

It is preferred that the protrusions are embossments. Embossing may allow to provide the protrusions in a cost effective way, especially when the diaphragm plate is made of a material easy to emboss. It is preferred that the embossments radially surround the center hole. Preferably, there are four embossments radially surrounding the center hole. It is preferred that the four embossments have the same angular distance from their neighbor embossments. Thus, each embossment is preferably, distanced from its neighbor embossment by 90° angular distance. However, in some embodiments there is just one embossment on the surface of the diaphragm plate facing the diaphragm. This will be a cost efficient yet effective solution. However, in some embodiments, there are two, three or five embossments.

Preferably, the equalization openings are arranged at a circumferential line of the diaphragm plate in the form of radial cut-outs. This allows for easy forming of the equalization openings. However, the equalization openings may also be formed as throughholes, thus not at the circumferential line but more towards the center of the center diaphragm plate. In other words, the equalization openings can be placed in any position of the diaphragm plate in order to align them with the equalization holes of the diaphragm. Preferably, there is one equalization hole in the diaphragm. In some embodiments of the invention, there are two or more equalization holes in the diaphragm.

It is preferred that the equalization hole of the diaphragm and the corresponding equalization opening of the diaphragm plate have the same diameter. This allows for producing the equalization holes and the equalization openings using the same drilling tool. Furthermore, when the equalization opening can be kept small, the diaphragm plate can have an increased rigidity and thus may be more robust. Preferably, all equalization holes and all equalization openings have the same diameter. As rotation of the diaphragm plate versus the diaphragm is prevented by the invention, there is no need to have equalization openings having a larger diameter than the diameter of the corresponding equalization hole with which it is aligned. However, as explained earlier, it may be advantageous when the equalization holes have a smaller diameter than the equalization openings. This reduces the tolerance demand with regards to alignment of the diaphragm plate. Thus, production of the diaphragm assembly may be easier or faster.

It is preferred that the diaphragm assembly comprises a nozzle and a washer, the nozzle cooperating with the washer so as to press the diaphragm and the diaphragm plate towards each other. Pressing the diaphragm plate towards the diaphragm may force the engagement zone into the surface of the diaphragm abutting the diaphragm plate and thus can ensure very good effect against rotation. Due to having the engagement zone, the pressure needed to force the engagement zone into the surface of the diaphragm may well be lower than the pressure necessary to reduce the risk of rotation without having an engagement zone. Thus, using the diaphragm plate or the washer ring having the engagement zone may prevent rotation effectively even with diaphragms made of weak material which would be damaged under excessive pressure.

Preferably, the nozzle has a cylindrical section passing through the diaphragm and the diaphragm plate, the nozzle being connected to the washer via the cylindrical section. Preferably, the cylindrical section is hollow. Thus, the nozzle may provide a fluid passage from the valve inlet to the valve outlet. Preferably the cylindrical section and the washer cooperate so as to provide the force for pressing the engagement zone into the diaphragm. By this, a permanent and constant force can be established. Preferably, the nozzle has a head section having a larger diameter than the cylindrical section. The head section thus may be easily supported on the diaphragm plate.

In a preferred embodiment of the invention, the diaphragm, the diaphragm plate, the nozzle and the washer are flanged together. It is preferred, that the cylindrical section of the nozzle has a flange, preferably on a circumferential outer surface. Furthermore, the washer preferably has a holding step, preferably on a circumferential inner surface surrounding the cylindrical section of the nozzle. Preferably, the cylindrical section of the nozzle passes through the diaphragm via the center hole of the diaphragm plate and a middle hole of the diaphragm. It is preferred that the cylindrical section is surrounded by the washer and the holding step can lock on the flange of the nozzle so as to come to a firm flanging of the diaphragm assembly. In some embodiments the washer comprises an end surface. This is preferably an axial end surface of the circumferential inner surface of the washer. The flange of the nozzle may then lock on the end surface so as to come to a firm flanging of the diaphragm assembly. Flanging is a well known and a simple way of keeping the components of the diaphragm assembly together while pressing the diaphragm and the diaphragm plate towards each other firmly.

It is preferred that the diaphragm plate has an annular rim section on a circumferential line of the diaphragm plate, the rim section having a free end protruding in a direction away from the diaphragm. Thus, the diaphragm plate has a bowl-like appearance. In other embodiments, the diaphragm plate is a plain flat disc. Having a bowl-like diaphragm plate can be advantageous as the diaphragm may in some embodiments rub on the circumferential line of the disc-like diaphragm plate when the diaphragm bulges up or down. This rubbing can be reduced when the circumferential line of the diaphragm plate does not end in a flat way parallel to the diaphragm but has the free radially outer end protruding away from the diaphragm.

In a preferred embodiment of the invention, the diaphragm comprises PTFE. It is even more preferred that the diaphragm consists of PTFE. PTFE is a reliable diaphragm material but does not allow hard flanging and furthermore has a low friction coefficient. Therefore, it was previously not a preferred material in the current setting. However, due to the invention, the diaphragm made from PTFE or consisting of PTFE is now possible to use in diaphragm assemblies in which rotation between the diaphragm plate and the diaphragm has to be prevented. It is most preferred that the diaphragm consists of modified PTFE, also called TFM™ PTFE. TFM™ PTFE is a second generation PTFE polymer.

TFM™ PTFE may resist heat as good as the first generation PTFE and maintains the chemical properties of the first generation PTFE. However, due to a denser polymer structure of TFM™ PTFE, the stress recovery is increased in comparison to first generation PTFE. This may reduce the risk of diaphragm damage.

It is furthermore preferred, that the valve arrangement is a solenoid valve.

Solenoid valves can make use of diaphragm assemblies for opening or closing the solenoid valve. Therefore, the invention can be of great advantage in such solenoid valves. However, in principle the invention can be applied to any kind of valve arrangement where a diaphragm assembly of the present design can be applied to control the fluid flow.

Furthermore, the object of the present invention is solved by the diaphragm assembly for the valve arrangement as described before. It is to be understood that the features and advantages described above in view of the valve arrangement also apply to the diaphragm assembly alone, the diaphragm assembly preferably comprising the diaphragm, the diaphragm plate, the nozzle and the washer.

It is preferred that in such a diaphragm assembly the diaphragm, the diaphragm plate, the nozzle and the washer are flanged together. This may result in a good rotational fixing between the diaphragm plate and the diaphragm without damaging the diaphragm.

BRIEF DESCRIPTION OF THE DRAWINGS

In the following, the present invention is described in detail in view of exemplary embodiments of the invention, the embodiments being illustrated with reference to the attached figures, in which.

DETAILED DESCRIPTION

Reference signs are introduced in the detailed description of embodiments and the attached patent claims. However, the reference signs shall only improve the readability and are in no way meant to be limiting. Furthermore, the described exemplary embodiments of the invention are not meant to be limiting the scope of the claims but are merely used to give examples of how to apply the invention.

Figure 1:
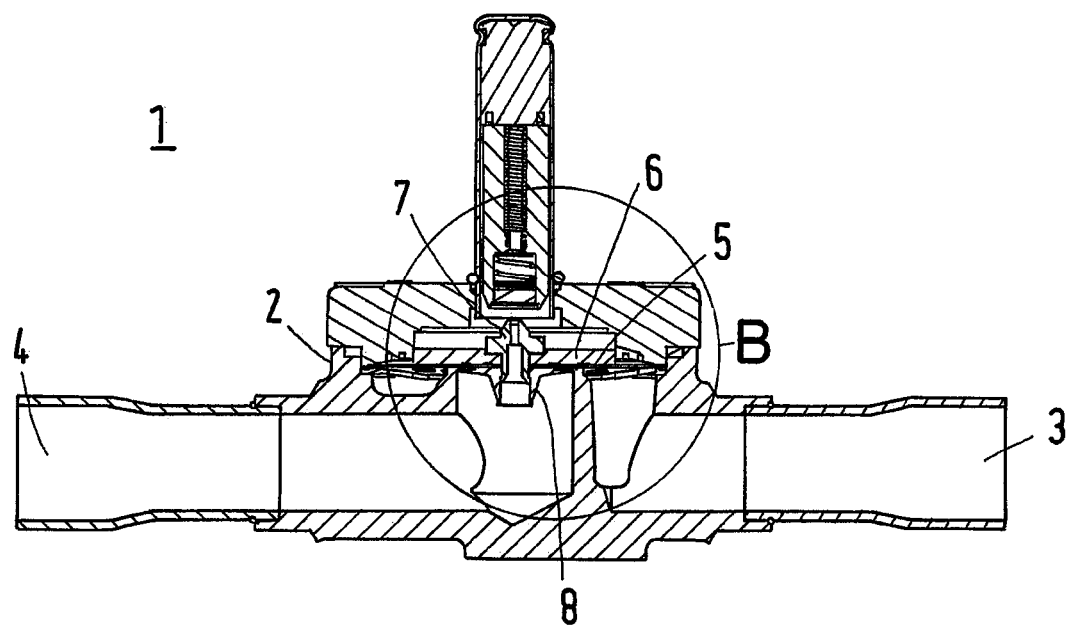
FIG. 1 shows a cross-section of a first embodiment of a valve arrangement according to the invention, the valve arrangement comprising a first embodiment of a diaphragm assembly according to the invention.

FIG. 1 shows a valve arrangement 1. The valve arrangement 1 comprises a valve housing 2, a valve inlet 3 and a valve outlet 4. Furthermore, the valve arrangement 1 comprises a diaphragm assembly. The diaphragm assembly comprises a circular diaphragm 5, a circular diaphragm plate 6, a nozzle 7 and a washer 8. The diaphragm plate 6 is partially covering the diaphragm 5.

Figure 2:
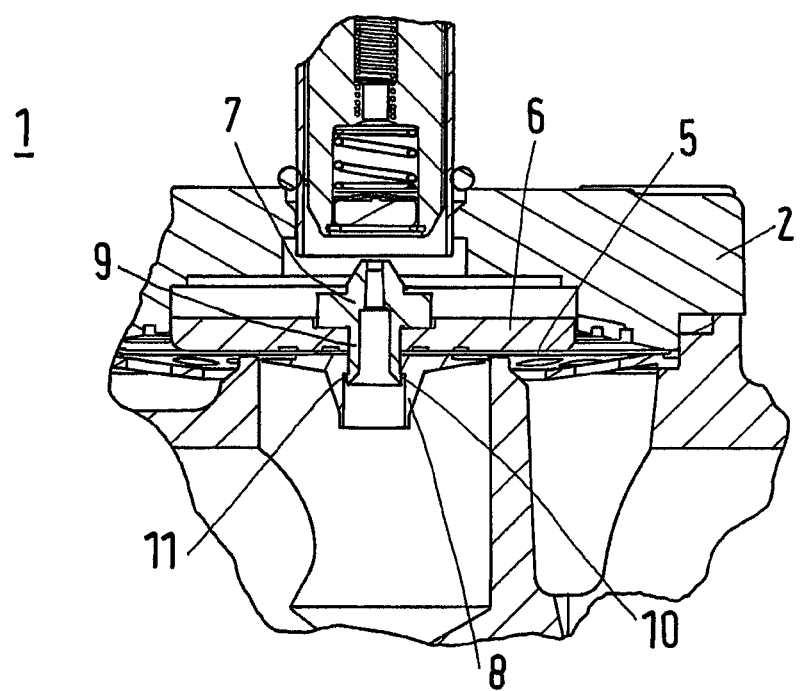
FIG. 2 shows a close-up view of the valve arrangement and the diaphragm assembly shown in FIG. 1.

FIG. 2 shows the valve arrangement 1 and the diaphragm assembly in further detail. The nozzle 7 has a cylindrical section 9. The nozzle 7 has furthermore a head section adjacent to the cylindrical section 9, the head section being supported on the diaphragm plate 6. The cylindrical section 9 is hollow and provides a fluid passage from the valve inlet 3 to the valve outlet 4. Furthermore, the cylindrical section 9 has a prominent connection step 10 on an outer side of a circumferential wall. The nozzle 7 and the washer 8 are flanged together by bending an end wall of the cylindrical section 9, thus forming the connection step 10. The washer 8 has a holding step 11 on an inner surface surrounding the cylindrical section 9. The connection step 10 of the cylindrical section 9 and the holding step 11 of the washer 8 cooperate with each other so that the nozzle 7, the diaphragm plate 6, the diaphragm 5 and the washer 8 are flanged together.

Figure 3:
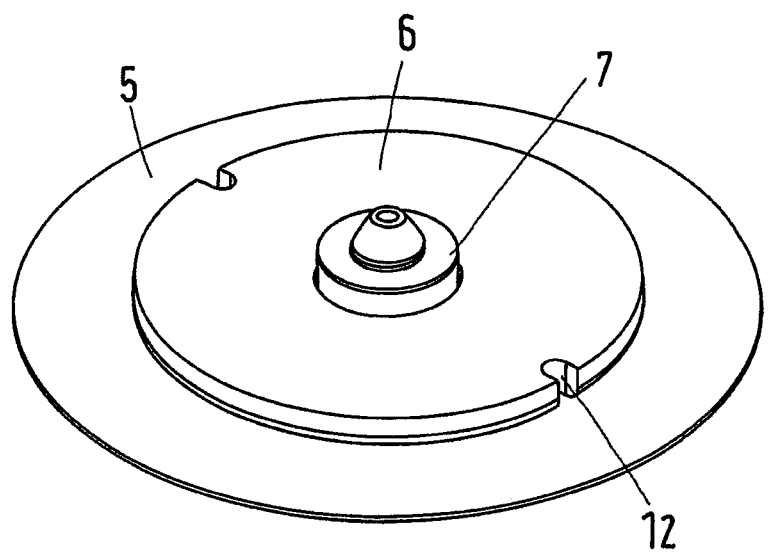
FIG. 3 shows the first embodiment of the embodiment of the diaphragm assembly in a perspective view.

FIG. 3 now shows the first embodiment of the diaphragm assembly in a perspective view. The diaphragm assembly comprises the diaphragm 5, the diaphragm plate 6, the nozzle 7 and the washer 8 (not shown). The diaphragm plate 6 has two equalization openings 12 which are arranged at a circumferential line of the diaphragm plate 6 in the form of radial cut-outs. The radial cut-outs have an angular distance between each other of 180°.

Figure 4:
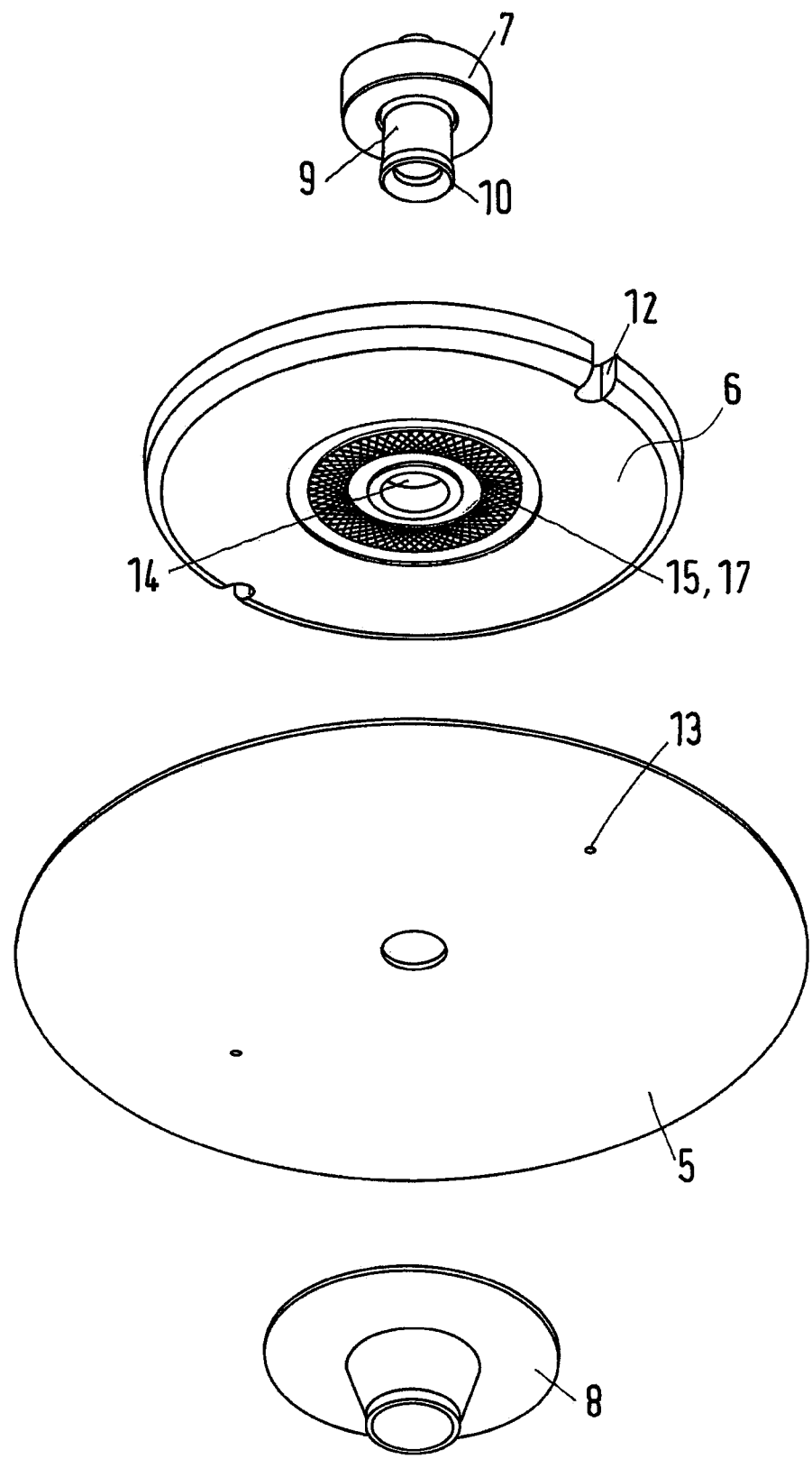
FIG. 4 shows the first embodiment of the diaphragm assembly in an exploded view.

As can be seen in FIG. 4, the equalization openings 12 each are aligned with corresponding equalization holes 13 which are present in the diaphragm 5.

As shown, the diaphragm plate 6 comprises an engagement zone engaging the diaphragm 5 in order to rotationally fix the diaphragm 5 and the diaphragm plate 6 with respect to each other. In this first embodiment of the invention, the engagement zone radially surrounds a center hole 14 of the diaphragm plate 6 and comprises protrusions 17 forming a knurling 15 engaging the diaphragm 5 when the diaphragm assembly is in the assembled state as shown in FIG. 3.

The knurling 15 in the first embodiment is pressed into the diaphragm 5 when the diaphragm assembly is flanged together by inserting the cylindrical section 9 through the diaphragm plate and the diaphragm into the washer 8. The washer 8 comprises the holding step 11 with which the connection step 10 of the cylindrical section 9 may cooperate in order to keep the diaphragm assembly assembled, pressing the diaphragm plate 6 and the diaphragm 5 towards each other.

The knurling 15 pressed into the diaphragm 5 rotationally fixes the diaphragm 5 and the diaphragm plate 6 with respect to each other. Therefore, unwanted rotation between the diaphragm 5 and the diaphragm plate 6 is prevented and the two equalization holes 13 of the diaphragm 5 and the corresponding two equalization openings 12 of the diaphragm plate 6 remain aligned to each other. This ensures proper functioning of the valve arrangement as equalization may take place through the equalization holes 13 of the diaphragm 5.

Figure 5:
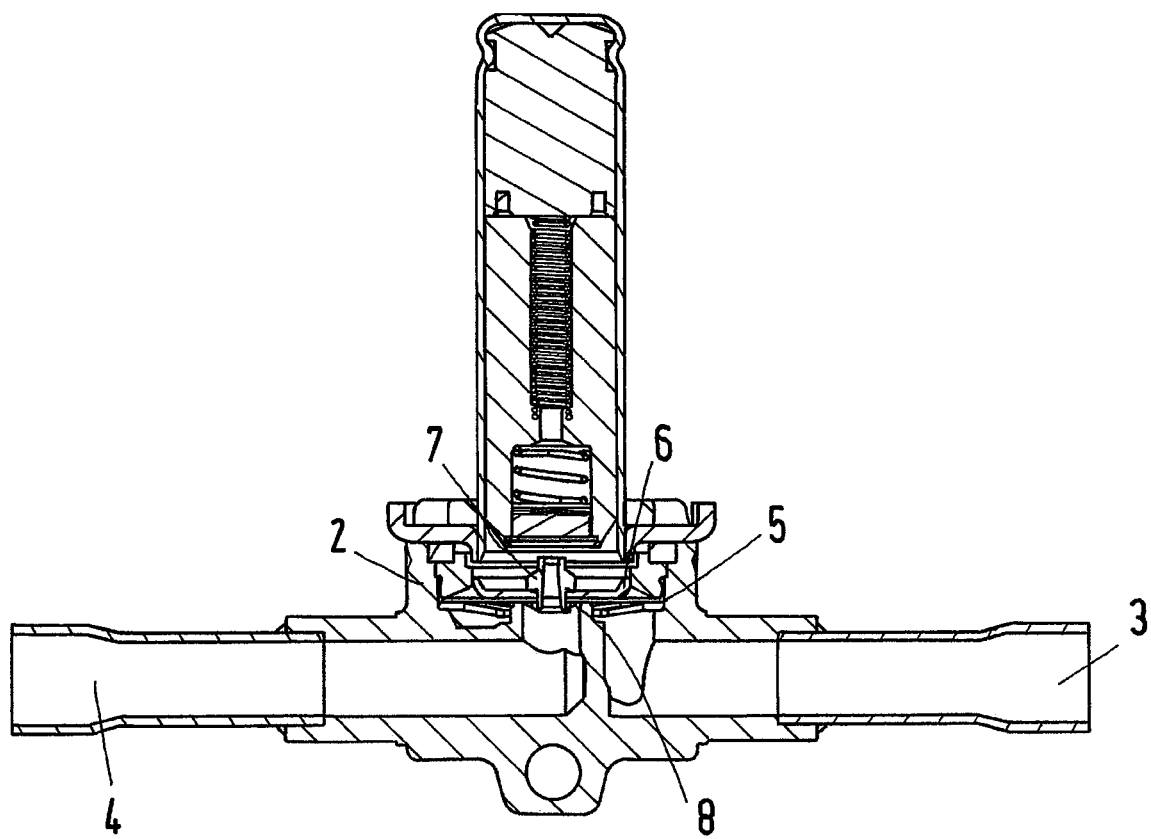
FIG. 5 shows a cross-section of a second embodiment of the valve arrangement according to the invention, the valve comprising having a second embodiment of the diaphragm assembly according to the invention.

FIG. 5 shows a second embodiment of the valve arrangement 1 according to the invention and the diaphragm assembly according to the invention. The valve arrangement 1 according to the second embodiment of the invention and the diaphragm assembly according to the second embodiment of the invention are identical in many aspects compared to the first embodiments of the invention, respectively.

Figure 6:
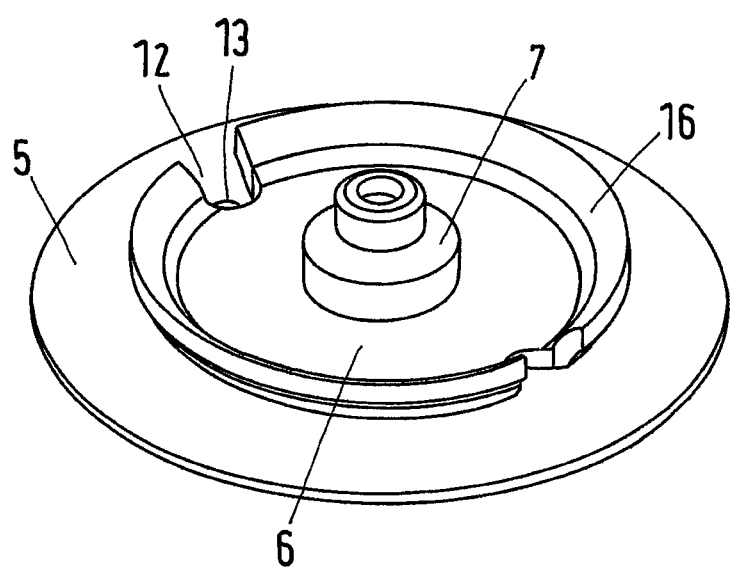
FIG. 6 shows a perspective view of the second embodiment of the diaphragm assembly.

However, as can be seen better in FIG. 6, the diaphragm assembly according to the second embodiment of the invention comprises a different diaphragm plate 6. The diaphragm plate 6 according to the second embodiment of the invention has an annular rim section 16 on a circumferential line of the diaphragm plate 6, the rim section 16 having a free end protruding in a direction away from the diaphragm 5. This design may reduce wear of the diaphragm 5 as rubbing of the diaphragm 5 when the diaphragm 5 bulges up or down on the circumferential line of the diaphragm plate 6 may be reduced. Furthermore, the rim section 16 guides the diaphragm assembly in the valve housing 2.

Figure 7:
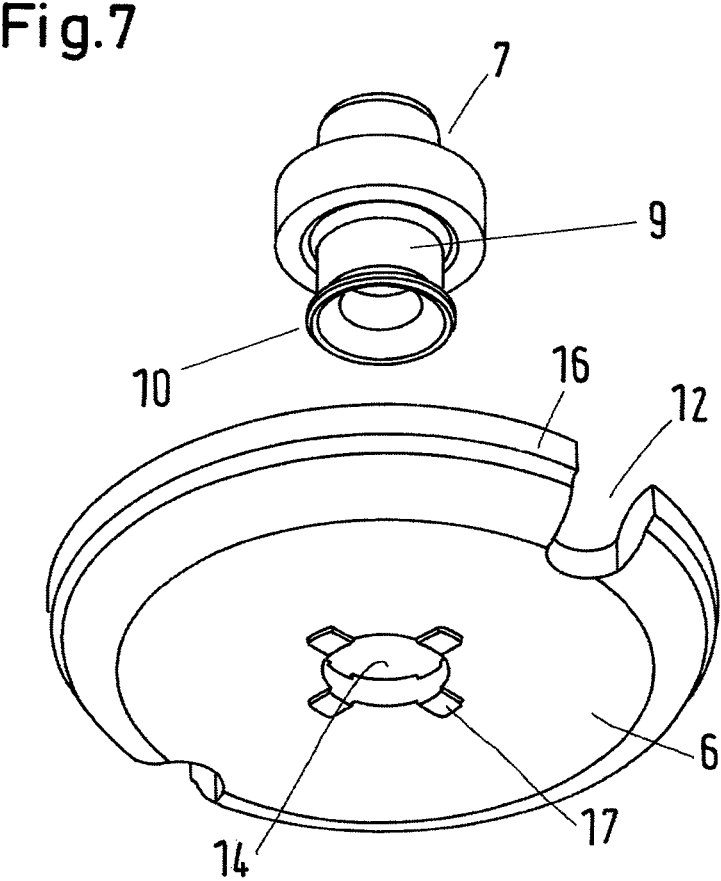
FIG. 7 shows an exploded view of the second embodiment of the diaphragm assembly.
Figure 7:
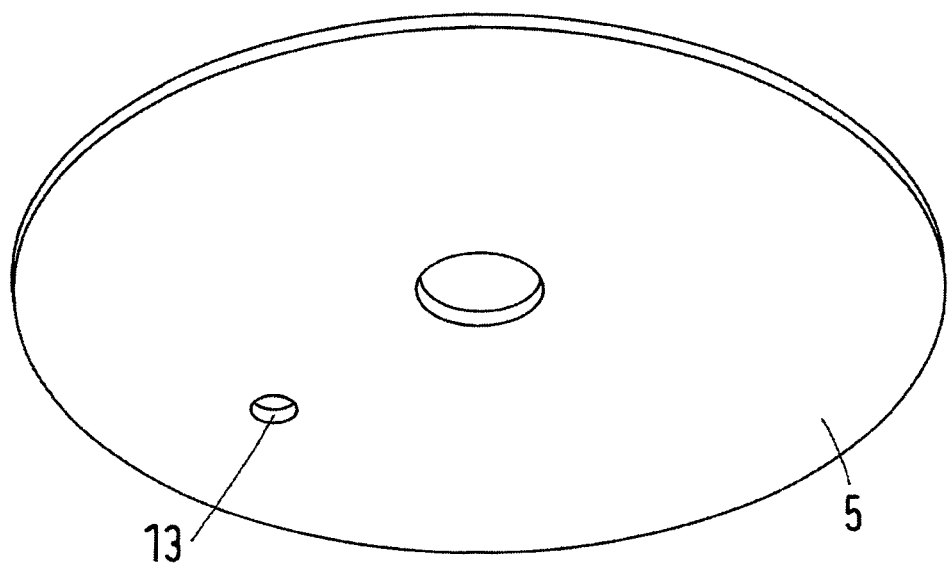
Figure 7:
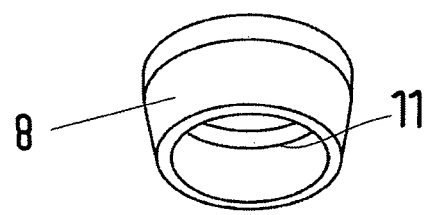

As can be seen in FIG. 7, in the second embodiment of the invention, the engagement zone of the diaphragm plate 6 comprises four protrusions 17 engaging the diaphragm 5 in the assembled state of the diaphragm assembly as shown in FIG. 6. The protrusions 17 are embossments. The embossments are arranged radially surrounding the center hole 14 and replace the protrusions 17 forming the knurling 15. Furthermore, take note that the in the second embodiment of the invention only one equalization hole 13 is present in the diaphragm 5. However, the diaphragm plate 6 still has two equalization openings 12 which means that the same diaphragm plate 6 as provided with the first embodiment of the invention may in some settings also be used with the second embodiment of the invention when the knurling 15 is replaced with embossments and vice versa for example when both valve housings 2 have the same dimensions. According to FIG. 7, the washer 8 and the nozzle 7 are clamped, or flanged, together in the same way as in FIG. 2.

As with the first embodiment of the invention, the engagement zone will be pressed into the diaphragm 5 once the diaphragm assembly is assembled. Thus, rotation between the diaphragm plate 6 and the diaphragm 5 will be prevented by the protrusions 17 being forced into the surface of the diaphragm 5.

Figure 8:
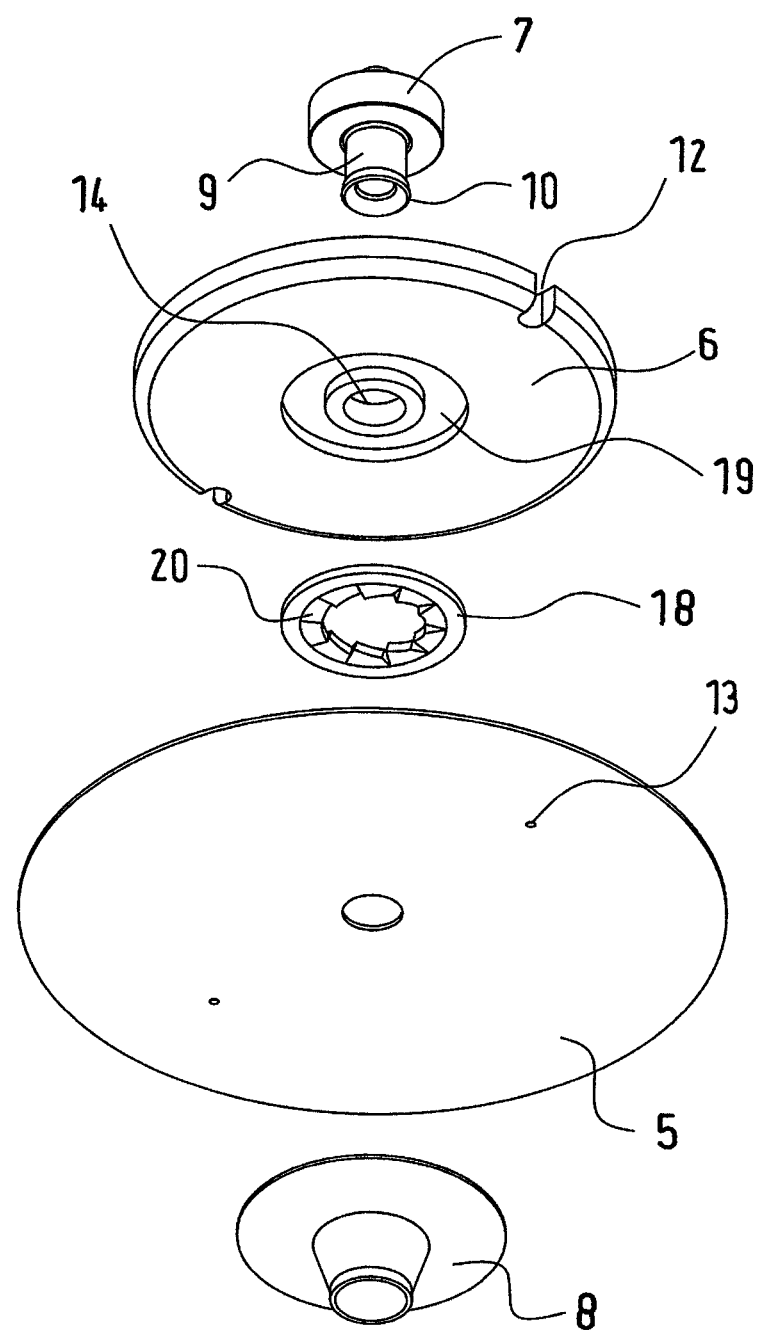
FIG. 8 shows an exploded view of a third embodiment of the diaphragm assembly.

A third embodiment of the invention is shown in FIG. 8. In this embodiment, the engagement zone is provided by a washer ring 18. The washer ring 18 coaxially surrounds the center hole 14 of the diaphragm plate 6. The diaphragm plate 6 has a seat 19 for the washer ring 18. The washer ring 18 comprises a plurality of teeth 20 serving as protrusions 17 in the engagement zone. The washer ring 18 is arranged interposed between the diaphragm 5 and the diaphragm plate 6. Therefore, edges of the teeth 20 engage both diaphragm 5 and the diaphragm plate 6 so as to provide good rotational fixing.

In the exemplary cases described, the 5 consists of TFM™ PTFE having the chemical formula $[(CF_2)_4-CF(-O-CF_2-CF_2-CF_3)-(CF_2)_5]_n$. Furthermore, in all shown embodiments of the invention, the valve arrangement 1 is a solenoid valve.

As can be seen in all three embodiments of the invention, the equalization hole 13 and the corresponding equalization opening 12 here have different diameters, respectively. Specifically, the diameter of each equalization opening 12 is larger than the diameter of each equalization hole 13 which allows for larger production tolerances. However, actually the equalization holes 13 of the diaphragm 5 and the corresponding equalization opening 12 of the diaphragm plate 6 may have the same diameter in other embodiments of the invention not shown as the invention prevents rotation of the diaphragm plate 6 and the diaphragm 5 to each other effectively.

While three separate embodiments are shown and described, it should be understood that the features of each of the embodiments may be combined with each other arbitrarily. In other words, features described in connection with the first embodiment of the invention may also be present in the second or third embodiment of the invention and vice versa.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A diaphragm assembly for controlling a fluid flow through a valve housing from a valve inlet to a valve outlet, the diaphragm assembly comprising a diaphragm, a diaphragm plate, a nozzle, and a washer being flanged together, the diaphragm plate at least partially covering the diaphragm, the diaphragm being made of non-fiber reinforced PTFE and comprising one or more equalization holes passing through the diaphragm and the diaphragm plate comprising one or more equalization openings passing through the diaphragm plate, the equalization holes being aligned with the equalization openings, wherein the diaphragm plate comprises an engagement zone formed on a surface of the diaphragm plate facing the diaphragm, the engagement zone contacting and at least partially covering the diaphragm, the engagement zone comprising at least one protrusion protruding outward from the surface of the diaphragm plate and engaging a corresponding surface of the diaphragm contacting and at least partially covered by the diaphragm plate, wherein the diaphragm, the diaphragm plate, the nozzle, and the washer are all pressed together via the engagement zone in order to rotationally fix the diaphragm and the diaphragm plate with respect to each other.

2. A valve arrangement comprising a valve housing, a valve inlet, a valve outlet, and a diaphragm assembly for controlling a fluid flow through the valve housing from the valve inlet to the valve outlet, the diaphragm assembly comprising a diaphragm, a diaphragm plate, a nozzle, and a washer being flanged together, the diaphragm plate at least partially covering the diaphragm, the diaphragm being made of non-fiber reinforced PTFE and comprising one or more equalization holes passing through the diaphragm and the diaphragm plate comprising one or more equalization openings passing through the diaphragm plate, the equalization holes being aligned with the equalization openings, wherein the diaphragm plate comprises an engagement zone formed on a surface of the diaphragm plate facing the diaphragm, the engagement zone contacting and at least partially covering the diaphragm, the engagement zone comprising at least one protrusion protruding outward from the surface of the diaphragm plate and engaging a corresponding surface of the diaphragm contacting and at least partially covered by the diaphragm plate, wherein the diaphragm, the diaphragm plate, the nozzle, and the washer are all pressed together via the engagement zone in order to rotationally fix the diaphragm and the diaphragm plate with respect to each other.

3. The valve arrangement according to claim 2, wherein the engagement zone radially surrounds a center hole of the diaphragm plate.

4. The valve arrangement according to claim 3, wherein the equalization openings are arranged at a circumferential line of the diaphragm plate in the form of radial cut-outs.

5. The valve arrangement according to claim 2, wherein the one or more protrusions form a knurling engaging the diaphragm.

6. The valve arrangement according to claim 5, wherein the equalization openings are arranged at a circumferential line of the diaphragm plate in the form of radial cut-outs.

7. The valve arrangement according to claim 2, wherein the one or more protrusions are embossments.

8. The valve arrangement according to claim 7, wherein the equalization openings are arranged at a circumferential line of the diaphragm plate in the form of radial cut-outs.

9. The valve arrangement according to claim 2, wherein the equalization openings are arranged at a circumferential line of the diaphragm plate in the form of radial cut-outs.

10. The valve arrangement according to claim 2, wherein an equalization hole of the one or more equalization holes passing through the diaphragm has a smaller diameter than a corresponding equalization opening of the one or more equalization openings passing through the diaphragm plate or the same diameter.

11. The valve arrangement according to claim 2, wherein the diaphragm assembly comprises a nozzle and a washer, the nozzle cooperating with the washer so as to press the diaphragm and the diaphragm plate towards each other.

12. The valve arrangement according to claim 11, wherein the nozzle has a cylindrical section passing through the diaphragm and the diaphragm plate, the nozzle being connected to the washer via the cylindrical section.

13. The valve arrangement according to claim 11, wherein the diaphragm, the diaphragm plate, the nozzle and the washer are flanged together.

14. The valve arrangement according to claim 2, wherein the diaphragm plate has an annular rim section on a circumferential line of the diaphragm plate, the rim section having a free end protruding in a direction away from the diaphragm.

15. The valve arrangement according to claim 2, wherein the valve arrangement is a solenoid valve.

* * * * *